(12) United States Patent
Cooper

(10) Patent No.: US 6,253,073 B1
(45) Date of Patent: Jun. 26, 2001

(54) RADIO TELEPHONE HAND SET NETWORK RESTRICTION

(75) Inventor: David Edward Cooper, Surrey (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/247,585

(22) Filed: Feb. 10, 1999

(30) Foreign Application Priority Data

Feb. 12, 1998 (GB) .................................... 9803014

(51) Int. Cl.[7] ...................................... G04M 1/66
(52) U.S. Cl. ...................... 455/411; 455/575; 455/528; 340/5.2
(58) Field of Search .................................... 455/410, 411, 455/412, 575, 550, 421, 528, 186.1; 380/23; 340/5.1, 5.2, 5.28, 5.23, 5.25

(56) References Cited

U.S. PATENT DOCUMENTS 5,021,776 * 6/1991 Anderson et al. .................. 340/5.2
5,430,892 * 7/1995 Motegi ............................... 455/186.1
5,457,737 * 10/1995 Wen .................................... 455/410

OTHER PUBLICATIONS

IEEE100 The Authoritative Dictionary of IEEE Standards Terms, 7th Edition, See pp. 1286–1287, Dec. 2000.*

* cited by examiner

*Primary Examiner*—Doris H. To
(74) *Attorney, Agent, or Firm*—Sughrue, Mion, Zinn, Macpeak & Seas, PLLC

(57) ABSTRACT

A mobile telephone hand set programmed to operate under the control of a CPU and protected against unauthorized use or cloning by means of a security engine. The security engine comprising a re-programmable write only memory, an interface register and a challenge timer and operating by the issue of a challenge from the challenge timer to the CPU, the CPU on receipt of the challenge responding by writing a value to the interface register for comparison therein with a value stored in the re-programmable write only memory, and the interface register signaling the result of the comparison.

8 Claims, 1 Drawing Sheet

RADIO TELEPHONE HAND SET NETWORK RESTRICTION

BACKGROUND OF THE INVENTION (1) Field of the Invention

This invention relates to mobile phones and in particular it relates to a security function for restricting the use of individual radio telephone hand sets to selected operator networks.

The hand set for which the invention is provided is a digital radio transceiver programmed to operate under the control of a central processing unit (CPU).

(2) Description of the Prior Art

Owing to the variations in pricing policy of network operators, the nominal selling price of mobile phones is often heavily discounted in favour of a higher call tariff. The possibility exists therefore of a user obtaining at very low, or even no cost, a hand set for use on a specified network with a relatively high call tariff. If the hand set were then to be used on a low call tariff network for which the charge for hand sets remained at full selling price then both network operators would be deprived of revenue. It is important to network operators therefore that use of hand sets be restricted to specified networks.

The adaptation of telephone hand sets by copying from or imitating a licensed hand set, normally for unauthorized sale or use, is known as cloning and this definition of cloning is used herein.

Prior art methods for prevention of unauthorized use and prevention of cloning of telephone hand sets include so called secret numbers and U.S. Pat. No. 5,430,892 for example describes a use of secret numbers stored in a ROM (read only memory).

Removal of the ROM from the circuit board of a telephone hand set properly connected to a target network would, however, allow unauthorized copies of the ROM to be obtained. An unscrupulous person would then be in a position to alter very many telephone hand sets merely by supplying the appropriate ROM.

SUMMARY OF THE INVENTION

It is an object of this invention to provide, inexpensively, an increased level of protection against unauthorized use or cloning of mobile telephone hand sets.

According to the invention there is provided a mobile telephone hand set programmed to operate under the control of a CPU and protected against unauthorized use or cloning by means of a security engine, the security engine comprising a re-programmable write only memory, an interface register and a challenge timer and operating by the issue of a challenge from the challenge timer to the CPU, the CPU on receipt of a challenge responding by writing a value to the interface register for comparison therein with a value stored in the re-programmable write only memory and the interface register signaling the result of the comparison.

The above and other objects, features and advantages of the present invention will become apparent from the following description referring to the accompanying drawing which illustrates an example of a preferred embodiment of the present invention.

DESCRIPTION OF THE PREFERRED EMBODIMENT

Figure 1:
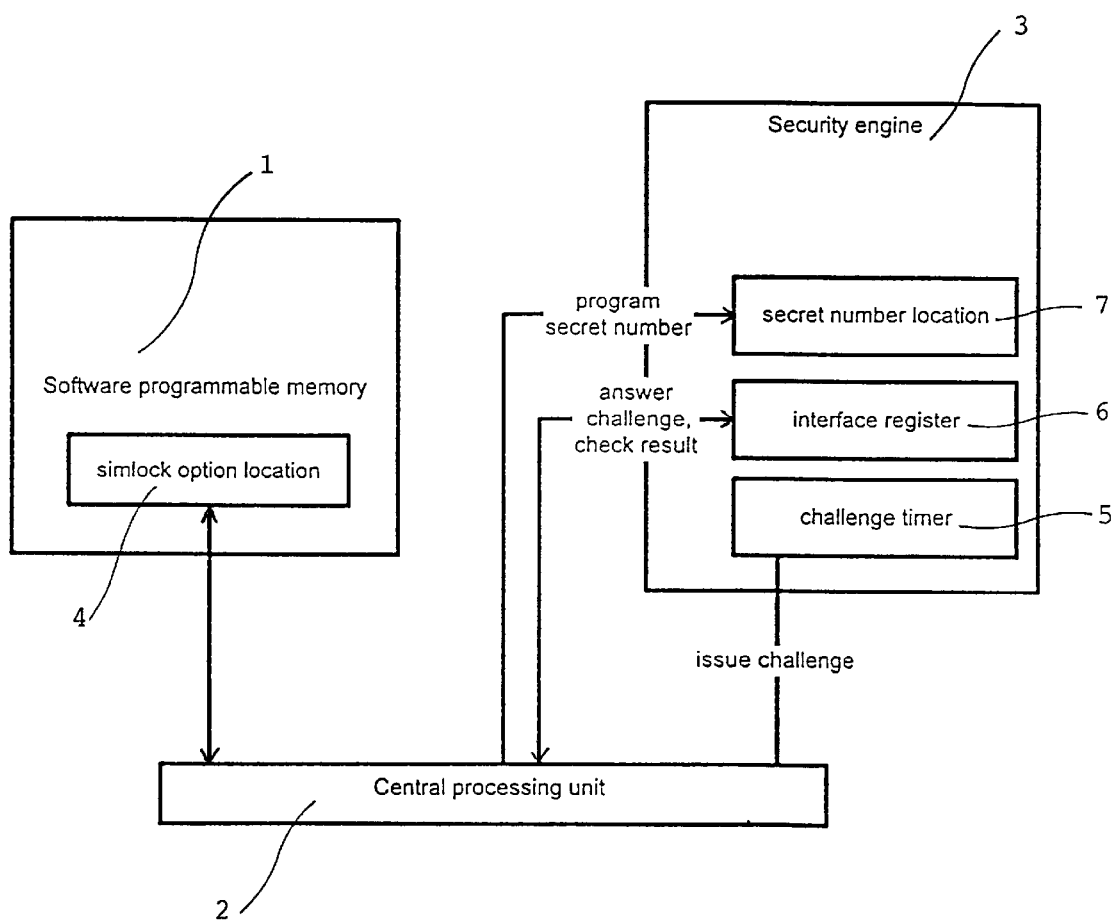
FIG. 1 is a basic block diagram illustrating an example of a preferred embodiment of the present invention.

An example of the invention will now be given with reference to the sole figure which is a block diagram illustrating the use of a security engine in a mobile phone hand set.

A mobile phone hand set includes programmable memory 1 a central processing unit (CPU) 2 and a security engine 3. A software program stored in programmable memory 1 operates under the control of the CPU.

Within the programmable memory 1 there is a location which shall be called the simlock (Subscriber Identity Module Lock) option location 4. The simlock option location 4 is programmed with a set of "public values". The purpose of the public values P0, P1, . . . Pn is to direct the software to check that the phone may be used within a specified network. These public values are not secret and are readily available and one of these values, say P0, is used to indicate that the phone may be used with any network.

The security engine 3 has a re-programmable location 7 with write only access. This re-programmable location 7 is called the secret number location and can be written to by the CPU once the CPU has correctly answered a challenge.

The value stored in the re-programmable write only memory consists of a set of secret numbers derived from and corresponding to the public values entered into the telephone for specified network use. The interface register 6 is an input/output register which can be written to and read from by the CPU.

A challenge timer 5 also forms a part of the security engine 3. In the secret number location 7 secret numbers S0, S1, S2 . . . Sn are programmed such that each secret number in the secret number location corresponds to a public value in the simlock option location 4. The secret numbers are entered in the secret number location at the time of manufacture. None of the secret numbers are equal to the public values.

The secret numbers programmed into the secret number location at manufacture must be kept secret by the manufacturer. Similarly any translation algorithm used to translate the public values stored in the simlock option location into the secret number series must also be the subject of strict secrecy by the manufacturer.

The challenge timer 5 begins the validation process after power is applied to the mobile phone hand set (power on). After a delay, the duration of the delay being set by the challenge timer, the security engine issues a challenge to the CPU 2 by the setting of a bit in the interface register. When the challenge is issued, a response from the CPU 2 writes a value into the interface register.

The value of the response from the CPU 2 is compared with the secret number in the secret number location and a signal indicative of the validity of the response from the CPU 2 is set in the interface register. A VALID RESPONSE signal is set when the CPU response to the challenge and the secret numbers stored in the secret number location match.

The CPU 2 reads the signal set in the interface register and if a VALID RESPONSE signal is set, then normal telephone operation continues. A mismatch between the CPU response to a challenge and the secret numbers will give rise to an INVALID RESPONSE indication in the interface register. An INVALID RESPONSE indication read by the CPU will cause the CPU to shut off the telephone operation.

Further challenges are issued at intervals set by and under the direction of the challenge timer.

In the mobile telephone hand set as described above, challenge timer 5 issues a challenge to the CPU 2 at fixed time intervals. The challenge is supplied to the CPU 2 by the setting of a bit in the interface register 6. The bit in the interface register 6 is written by the security engine 3. The CPU 2 on receipt of the challenge responds to the security engine 3 by writing the derived secret number to the interface register 6 for comparison with the secret numbers stored in the secret number location 7. In this case, the CPU 2 reads at least one of the public values from the simlock option location 4 to derive a secret number based on the readout value.

What is claimed is:

1. A mobile telephone hand set programmed to operate under the control of a CPU and protected against unauthorized use or cloning by means of a security engine, said security engine comprising a re-programmable write only memory, an interface register and a challenge timer and operating by the issue of a challenge from the challenge timer to the CPU, the CPU on receipt of the challenge responding by writing a value to the interface register for comparison therein with a value stored in the re-programmable write only memory, and said interface register signaling the result of the comparison.

2. A mobile telephone hand set according to claim 1, wherein the signal of the result of the comparison from the interface register indicates that an incorrect match was found between the value written to the interface register by the CPU and the value stored in the re-programmable write only memory.

3. A mobile telephone hand set according to claim 2, wherein when the signal indicating an incorrect match from the interface register is read by the CPU, the CPU shut off a telephone operation in the mobile telephone forcibly.

4. A mobile telephone hand set according to claim 1, wherein the value stored in the re-programmable write only memory consists of a set of secret numbers derived from and corresponding to the public values entered into the telephone for specified network use.

5. A mobile telephone hand set according to claim 2, wherein the value stored in the re-programmable write only memory consists of a set of secret numbers derived from and corresponding to the public values entered into the telephone for specified network use.

6. A mobile telephone hand set according to claim 3, wherein the value stored in the re-programmable write only memory consists of a set of secret numbers derived from and corresponding to the public values entered into the telephone for specified network use.

7. A mobile telephone hand set comprising:

a programmable memory programmed with a set of public values in advance, a CPU that reads at least one of the public values from the programmable memory to derive a secret number from the readout value, and a security engine comprising a re-programmable write only memory and an interface register, wherein said re-programmable write only memory is programmed with a set of secret numbers derived from and corresponding to the public values stored in the programmable memory, and said interface register, which can be written to and read from by the CPU, compares the secret number written by the CPU with the secret numbers stored in the re-programmable write only memory and informs result of the comparison to the CPU.

8. A mobile telephone hand set according to claim 7, wherein the security engine further comprises a challenge timer that issues a challenge to the CPU at fixed time intervals, and the-CPU on receipt of the challenge responds by writing the derived secret number to the interface register for comparison with the secret numbers stored in the re-programmable write only memory.

* * * * *

UNITED STATES PATENT AND TRADEMARK OFFICE
CERTIFICATE OF CORRECTION

PATENT NO.    : 6,253,073 B1  Page 1 of 1
DATED         : June 26, 2001
INVENTOR(S)   : David Edward Cooper It is certified that error appears in the above-identified patent and that said Letters Patent is hereby corrected as shown below:

<u>Title page,</u>
Item [30], Foreign Application Priority Data, after "9803014" insert -- .1 --

Signed and Sealed this

Twenty-seventh Day of July, 2004

JON W. DUDAS
*Acting Director of the United States Patent and Trademark Office*